(12) United States Patent
Kabumoto et al.

(10) Patent No.: US 6,259,866 B1
(45) Date of Patent: Jul. 10, 2001

(54) IMAGE FORMING APPARATUS

(75) Inventors: Masaaki Kabumoto, Chiba; Kazuyoshi Yamada, Kanagawa, both of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/421,220

(22) Filed: Oct. 20, 1999

(30) Foreign Application Priority Data

Oct. 21, 1998 (JP) .................................................. 10-319828

(51) Int. Cl.[7] .................................................. G03G 15/00
(52) U.S. Cl. .................................................. 399/1; 399/81
(58) Field of Search .................. 399/1, 81; 345/173, 345/175; D14/371, 389, 390; D18/41

(56) References Cited

U.S. PATENT DOCUMENTS

| D. 426,259 | * | 6/2000 | Kabumoto et al. | D18/41 |
| 4,707,845 | * | 11/1987 | Krein et al. | 345/173 X |
| 5,394,251 | * | 2/1995 | Aikens | 399/81 X |
| 5,488,453 | * | 1/1996 | Labudde et al. | 399/1 |
| 5,642,185 | * | 6/1997 | Altrieth et al. | 399/81 |

FOREIGN PATENT DOCUMENTS

| 7-261904 | 10/1995 | (JP) . |
| 8-220941 | 8/1996 | (JP) . |
| 9-160322 | 6/1997 | (JP) . |
| 9-214738 | 8/1997 | (JP) . |

* cited by examiner

*Primary Examiner*—Fred L. Braun
(74) *Attorney, Agent, or Firm*—Oblon, Spivak, McClelland, Maier & Neustadt, P.C.

(57) ABSTRACT

An image forming apparatus includes an operation and display device having an LCD (Liquid Crystal Display) panel or similar touch panel and a key portion including various keys mounted on its body. The body is curved with a suitable curvature in the up-and-down direction and right-and-left direction. The display surface of the touch panel and the key portion are positioned on the concave side of the curved body; the key portion is arranged below the display surface. The distance between the concave surface and the operator is the same at all positions on the concave surface. The operator can therefore smoothly operate both of the touch panel and key portion with by moving the operator's arm, hand and eyes little.

12 Claims, 5 Drawing Sheets

IMAGE FORMING APPARATUS

BACKGROUND OF THE INVENTION

The present invention relates to a copier, printer facsimile apparatus or similar image forming apparatus and more particularly to an image forming apparatus including an operation and display device protruding upward from its body and easy to operate.

Today, an operation and display device included in a copier, printer or similar image forming apparatus is, in many cases, implemented by the combination of a touch panel and keys. The touch panel is buried in the top of the body of the apparatus or protrudes upward therefrom. The protruding type of touch panel is predominant with, e.g., a large size image forming apparatus to be situated at a copy center. This type of touch panel allows the operator standing by the apparatus to operate it while looking straight ahead, i.e., without turning the operator's eyes downward.

In a conventional image forming apparatus with the protruding type of touch panel, an operation and display panel including the touch panel is supported by an arm above the top of the apparatus. The operation and display device includes the touch panel, e.g., a CRT (Cathode Ray Tube) or an LCD (Liquid Crystal Display) panel and a key portion including various keys and arranged below the touch panel. The display surface of the touch panel is inclined slightly upward while the key portion is inclined slightly downward. That is, the touch panel and key portion are angularly spaced from each other as if they were separate from each other.

However, the above conventional operation and display device has a problem that the operator touching the touch panel or any key of the key portion has to change the angle of the operator's hand or finger when intending to touch any key or the touch panel, respectively. That is, the transition from the operation of the touch panel to the operation of the key portion is not smooth.

Further, the operator has to turn the operator's eyes between the touch panel and the key portion over a broad angle. This is not only troublesome to perform, but also liable to bring about mishandling. Moreover, because the touch panel should necessarily be inclined slightly upward, light around the touch panel is apt to be incident to the panel and make information appearing on the panel difficult to see. Should the angle of the touch panel be changed to avoid such light, the key portion would be inclined downward too much for the operator to easily manipulate it.

Technologies relating to the present invention are disclosed in, e.g., Japanese Patent Laid-Open Publication Nos. 7-261904, 8-220941, 9-160322, and 9-214738.

SUMMARY OF THE INVENTION

It is therefore an object of the present invention to provide an image forming apparatus including an operation and display device which the operator can operate by turning the eyes little and with a minimum of change in touch between a touch panel and a key portion and even between the remote portions of the touch panel.

It is another object of the present invention to provide an image forming apparatus including an operation and display device configured to minimize light to be incident to a touch panel thereof.

It is another object of the present invention to provide an image forming apparatus including an operation and display device which the operator can easily manipulate by turning the operator's eyes little while stacking documents or confirming copies driven out of the apparatus.

An image forming apparatus of the present invention includes an apparatus body, and an operation and display device protruding upward from the apparatus body and including a touch panel which the operator can operate by touching. The operation and display device includes a body curved in a substantially spherical configuration in the up-and-down direction and right-and-left direction. The touch panel has a display surface positioned on the concave side of the curved body.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
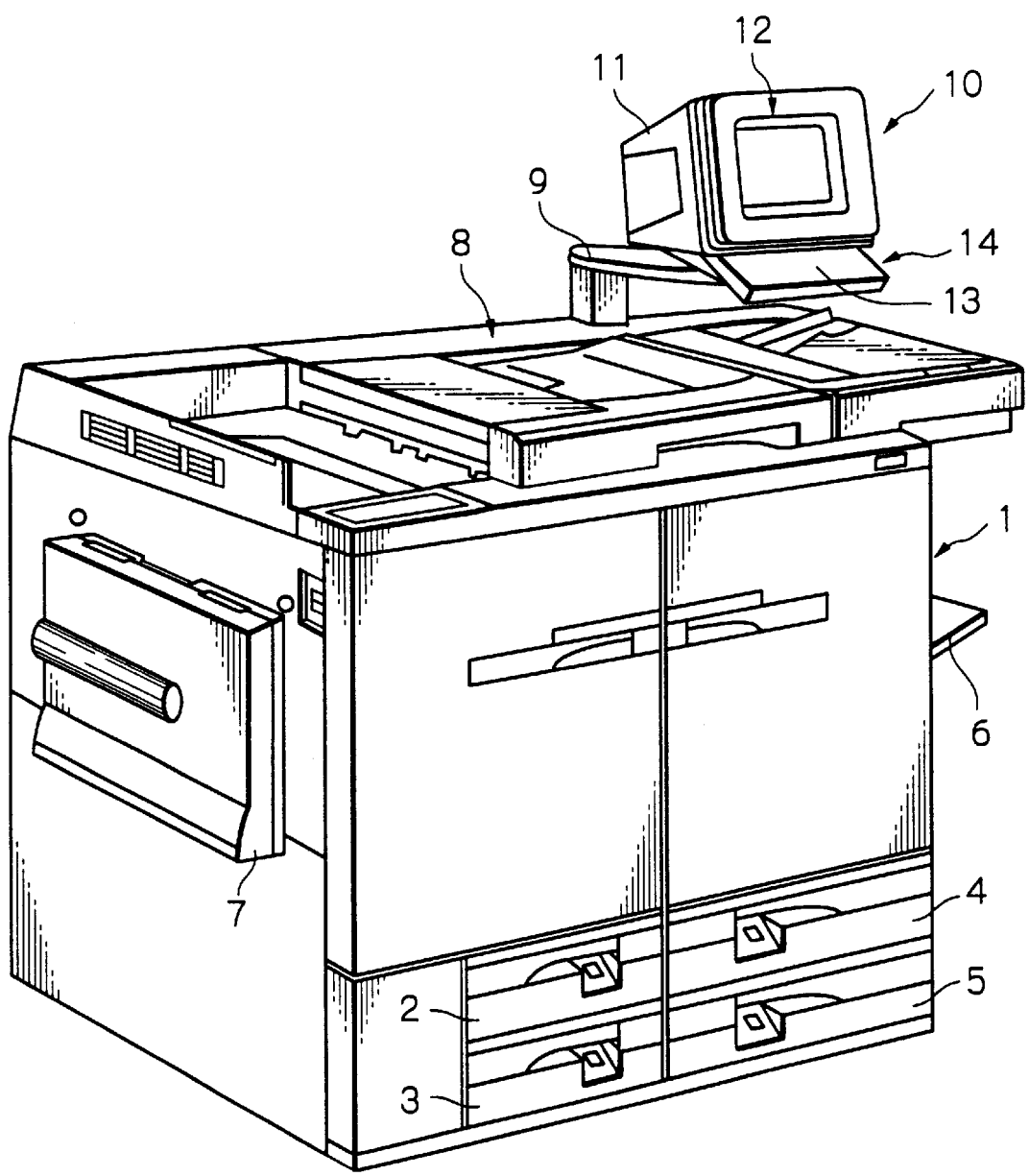
FIG. 1 is an isometric view showing a conventional image forming apparatus with an operation and display device protruding upward.
Figure 2:
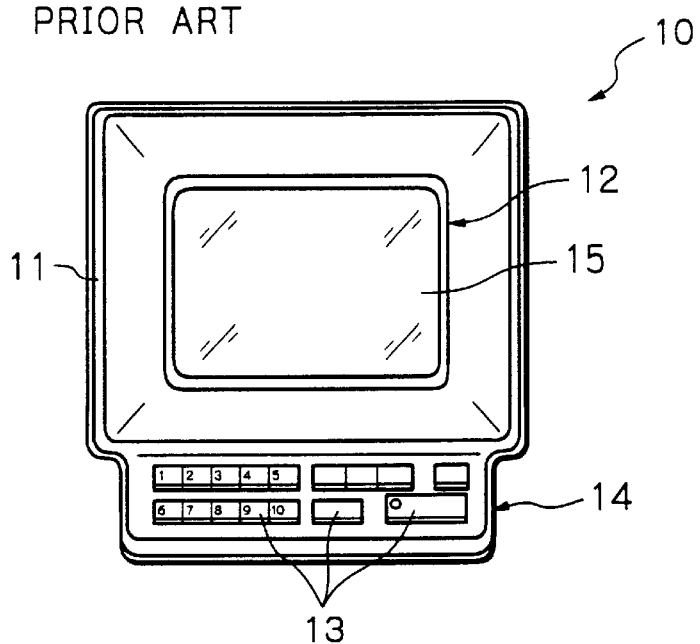
FIG. 2 is a front view of the operation and display device shown in FIG. 1.

To better understand the present invention, brief reference will be made to a conventional image forming apparatus with an operation and display device protruding from its top, shown in FIGS. 1 and 2. As shown, the image forming apparatus is implemented as a copier by way of example and includes a copier body 1, removable paper feed trays 2–5, a manual paper feed tray 6, a copy tray 7, and an ADF (Automatic Document Feeder) 8 capable of automatically feeding documents one by one. An arm 9 is mounted on the upper portion of the copier body 1 and supports an operation and display device 10 above the ADF 8.

The operation and display device 10 includes a body 11 on which a touch panel 12 including a display surface 15 and a key portion 14 including keys 13 are arranged. The touch panel 12 is implemented by, e.g., a CRT or an LCD panel. The body 11 is positioned such that the display surface 15 of the touch panel 12 is inclined slightly upward, and such that the key portion 14 below the touch panel 12 is inclined slightly downward to facilitate the operation of the keys 13. More specifically, as shown in FIG. 1, the touch panel 12 and key portion 14 are angularly spaced from each other as if they were separate from each other.

Figure 3:
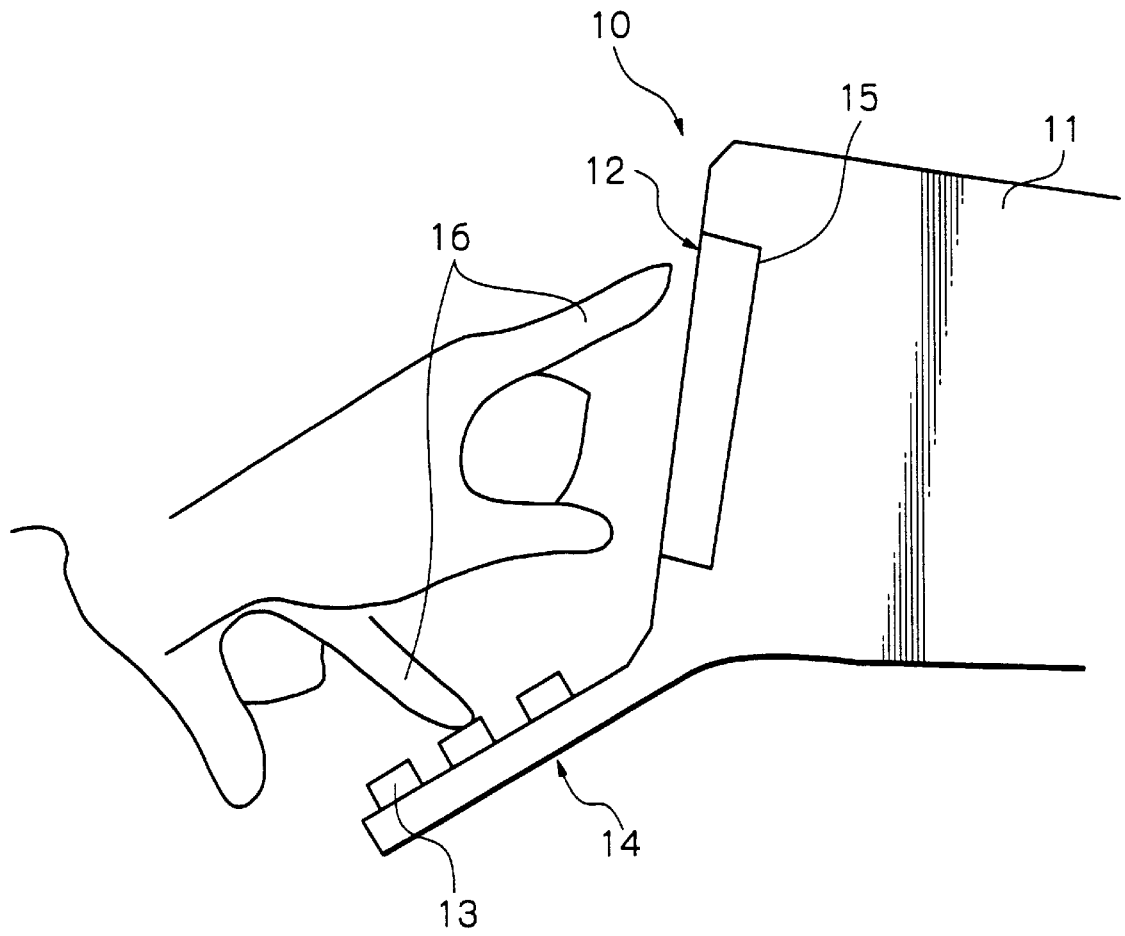
FIG. 3 is an enlarged side elevation demonstrating how the operator operates the operation and display device of FIG. 1.

However, the above conventional operation and display device 10 has some problems left unsolved, as follows. The operator touching the touch panel 12 or any key 13 of the key portion 14 has to change the angle of the operator's hand and finger when intending to touch any key 13 or the touch panel 12, respectively. For example, as shown in FIG. 3, assume that the operator positions the operator's forefinger 16 at an angle easy to touch the touch panel 12 and then intends to touch a desired key 13 of the key portion 14 with the same forefinger 16. Then, the operator has to lower the forefinger 16 while moving the operator's hand slightly away from the operation and display device 10, until the forefinger 16 reaches an angle easy to operate the desired key 13. Therefore, transition from the operation of the touch panel 12 to the operation of the key portion 14 is not smooth. Also, when the touch panel 12 has a broad display area, the operator's hand and finger have to be moved over a great angle in the up-and-down direction and right-and-left direction.

Further, the operator has to turn the operator's eyes between the touch panel 12 and the key portion 14 by a great angle. This is not only troublesome to perform, but also liable to bring about mishandling. Moreover, because the touch panel 12 should necessarily be inclined slightly upward, light around the touch panel 12 is apt to be incident to the panel 12 and make information appearing on the panel 12 difficult to see. Should the angle of the touch panel 12 be changed to avoid such light, the key portion 14 would be inclined downward too much for the operator to easily manipulate it.

Preferred embodiments of the image forming apparatus in accordance with the present invention will be described hereinafter. It is to be noted that a touch panel included in the illustrative embodiments refers to all devices which the operator can operate with, e.g., the operator's finger and including an LCD panel and a CRT.

Figure 4:
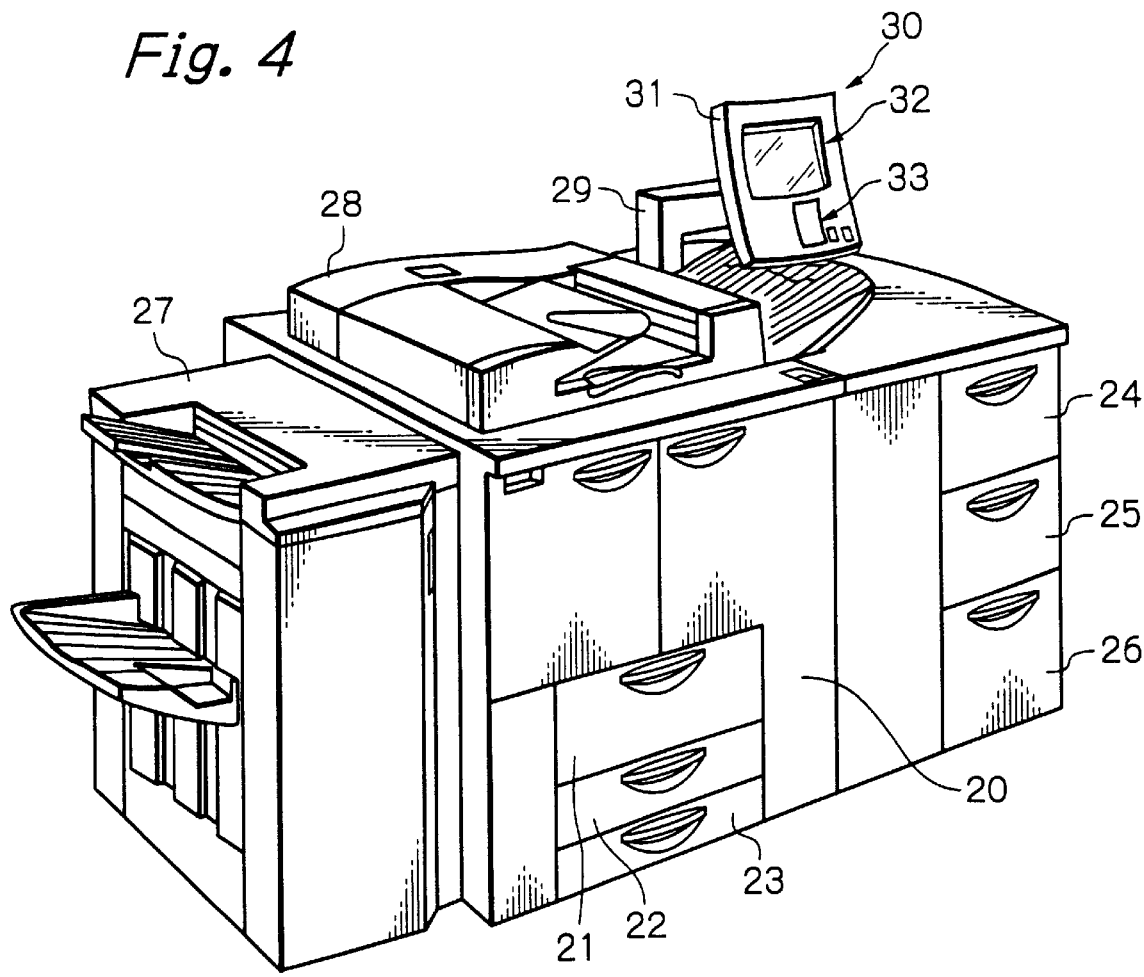
FIG. 4 is an isometric view showing an image forming apparatus embodying the present invention.
Figure 5:
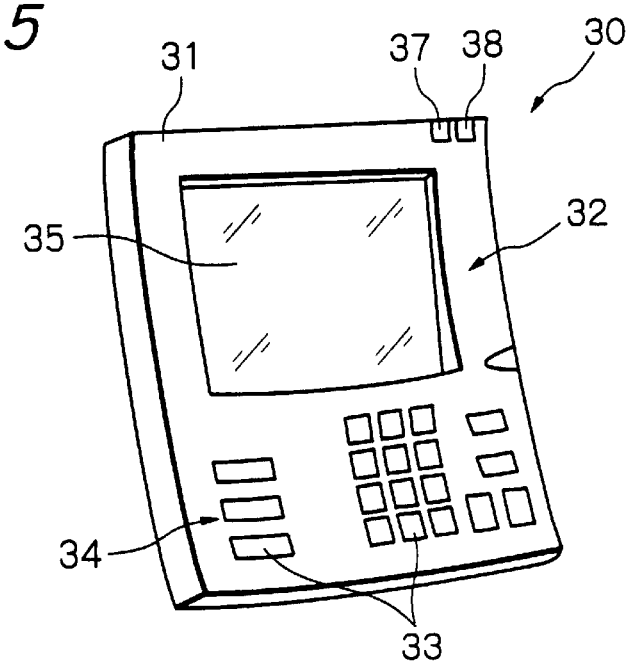
FIG. 5 is an isometric view of an operation and display device included in the illustrative embodiment.
Figure 6:
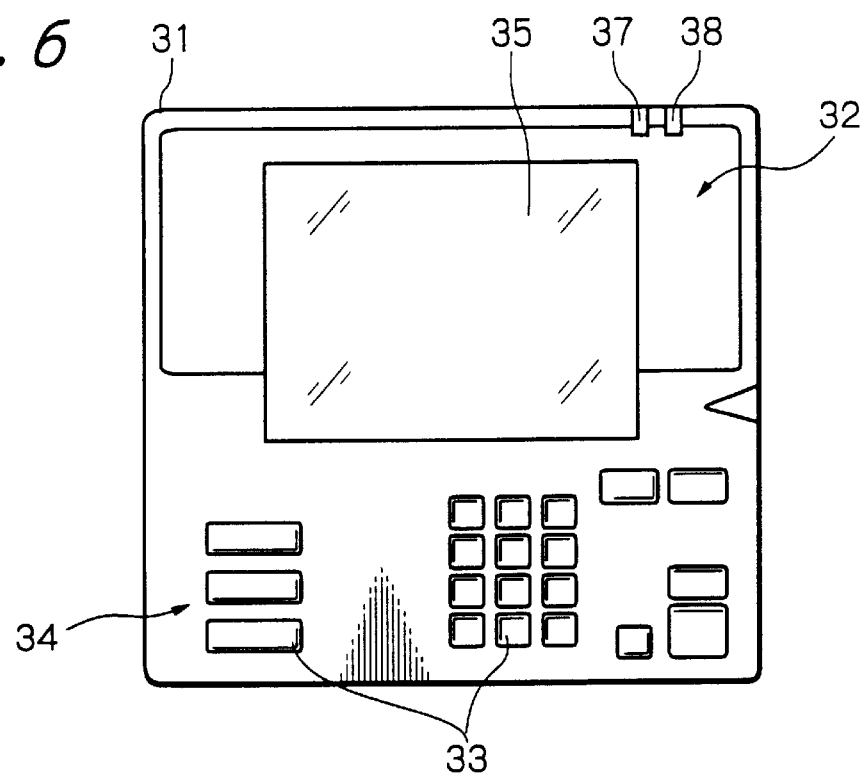
FIGS. 6 and 7 are respectively a front view and a side elevation showing the operation and display device of the illustrative embodiment.

FIG. 4 shows an image forming apparatus embodying the present invention and implemented as a copier by way of example. As shown, the copier includes a copier body 20, removable paper feed trays 21–23, mass paper feed trays 24–26, a copy discharge device 27, and an ADF 28. An arm 29 is mounted on the upper portion of the copier body 20 and supports an operation and display device 30 above the ADF 28. In the illustrative embodiment, the operation and display device 30 is positioned just at the right of the ADF 28, as seen from the front of the copier body 20.

The operation and display device 30 will be described more specifically with reference to FIGS. 4–7. The operation and display device 30 has a body 31 on which a touch panel 32 and a key portion 34 including keys 33 are arranged. The touch panel 32 is implemented by, e.g., an LCD panel. The body 31 is curved with a suitable curvature in both of the up-and-down and right-and-left directions and appears as if it were a part of a sphere. Of course, the body 31 may be curved with a particular curvature in each of the above directions and therefore may not be spherical.

A display surface 35 included in the touch panel 32 and the key portion 34 are positioned on the concave side of the body 31, as illustrated; the key portion 34 is positioned below the display surface 35. The body 31 is supported by the arm 29 via a universal joint 36 and can be held in any desired angular position. Lamps 37 and 38 are positioned at the upper right corner of the body 31 for showing the operator the operating status of the copier body 20.

Figure 7:
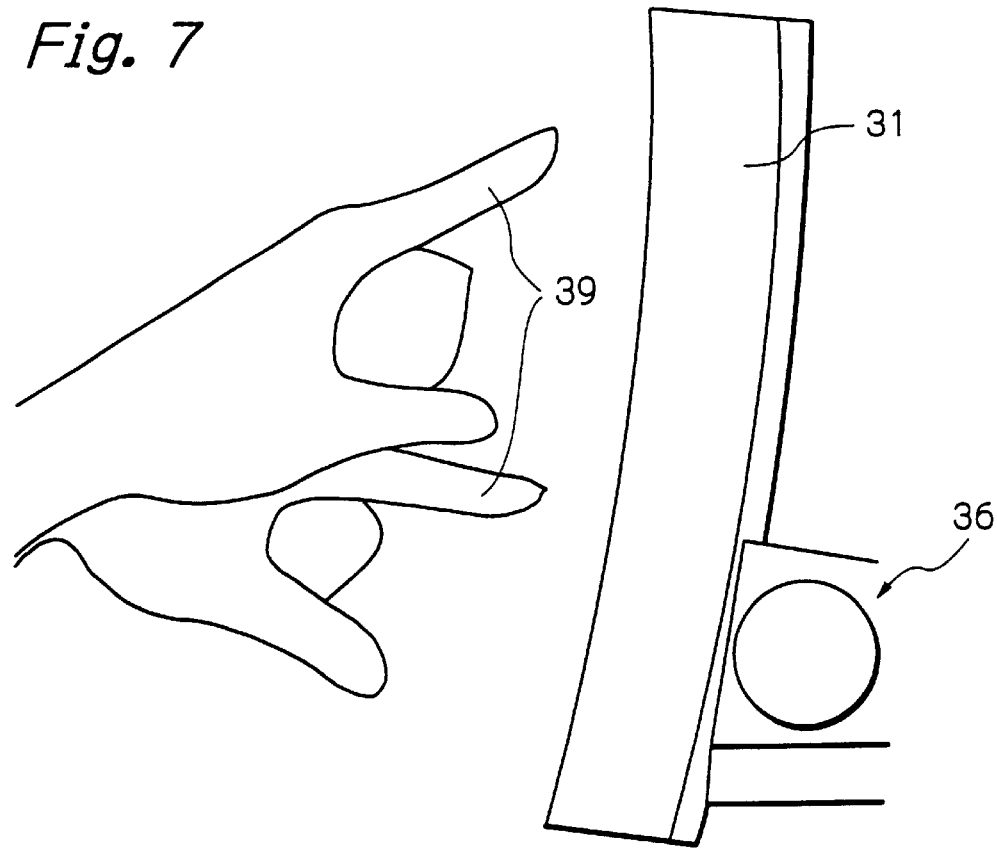

The operation and display device 30 allows the operator to touch keys appearing on the display surface 35 of the touch panel 32 or to operate the keys 33 of the key portion 34, as desired, by changing the angle of the operator's hand and finger little. Specifically, as shown in FIG. 7, assume that the operator positions the operator's forefinger 39 at an angle easy to touch the touch panel 32 and then intends to operate a desired key 33 of the key portion 34 with the same forefinger 39. Then, the operator should only shift the forefinger 39 in the up-and-down direction (FIG. 7) or in the right-and-left direction about the elbow or the wrist, i. e., the operator does not have to noticeably move the entire arm. Stated another way, the distance from the operator to the concave side of the body 31 is the same at all positions on the concave side. This successfully minimizes the turn of the operator's eyes between the touch panel 32 and the key portion 34 to operate and thereby ensures smooth operation involving a minimum of movement of arm and hand.

When light around the touch panel 32 is incident to the display surface 35 of the touch panel 32, the operator may tilt the entire body 31, e. g., downward about the universal joint 36. At this instant, the upper edge of the curved body 31 plays the role of a penthouse for the display surface 35 and intercepts light to a certain degree. It is therefore possible to reduce incident light without tilting the body 31 by a great angle. Even when the operator so tilts the body 31, the angle of the operator's hand does not change between the touch panel 32 and the key portion 34.

The operation and display device 30 is positioned above the ADF 28 and just at the right of the ADF 28, as seen from the front of the copier body 1, as stated earlier. The operator can therefore stack documents on the ADF 28 and operate the touch panel 32 by moving the operator's body little and turning the operator's eyes little. The operation and display 30 may, of course, be shifted further rightward on the copier body 1 away from the ADF 28. In any case, the operation and display device 30 located at the right-hand side, as seen from the front of the copier body 1, can be easily operated by the operator's right hand.

Figure 8:
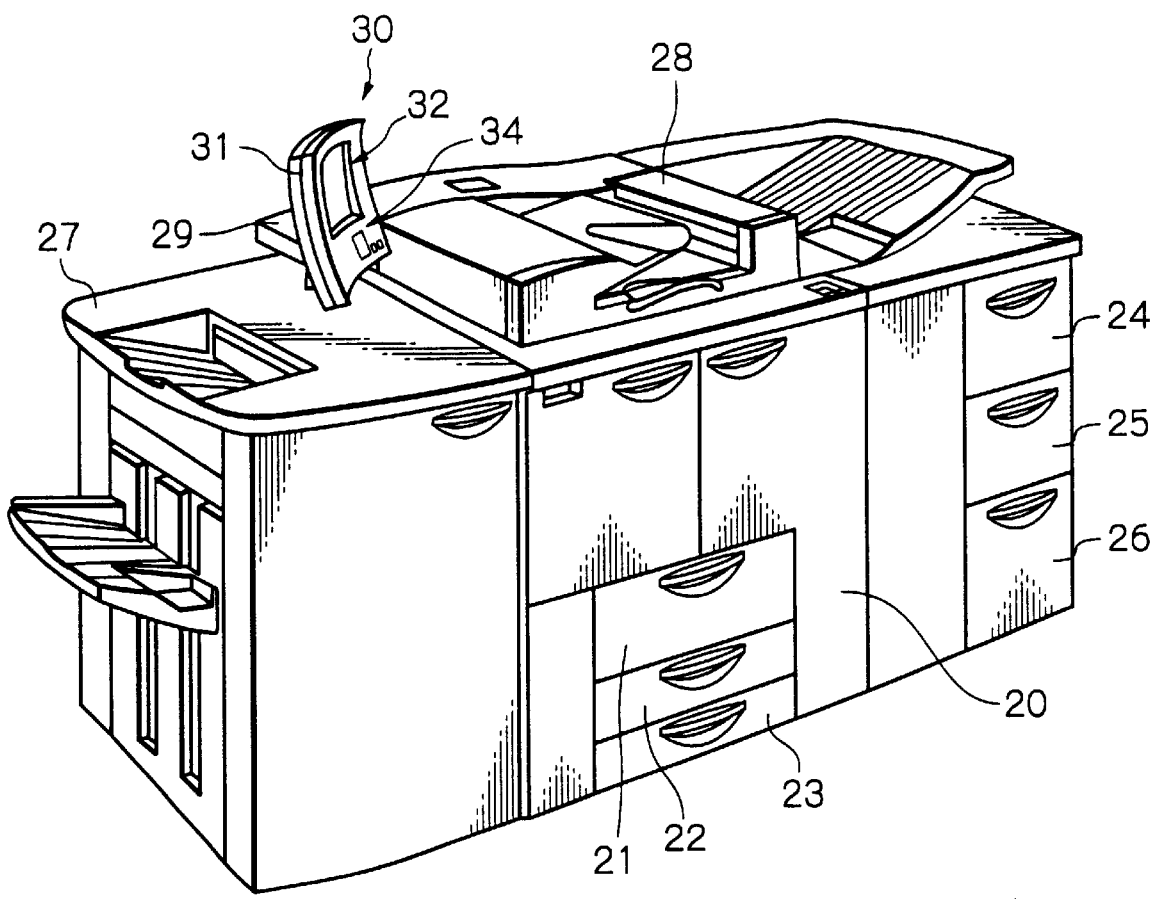
FIG. 8 is an isometric view showing an alternative embodiment of the present invention.

FIG. 8 shows an alternative embodiment of the present invention also implemented as a copier by way of example. As shown, this embodiment differs from the above embodiment in that the operation and display device 30 is positioned at the boundary between the copier body 20 and the copy discharge device 27 or slightly closer to the paper discharge device 27. With this configuration, the illustrative embodiment allows the operator to manipulate, with a minimum of movement of body, the operation and display device 30 while confirming a copy or paper driven out to the paper discharge device 27. This configuration is extremely convenient when the operator causes the copier body 20 to output copies while confirming the positions of images on the copies. As for the rest of the construction, this embodiment is identical with the previous embodiment.

Figure 9:
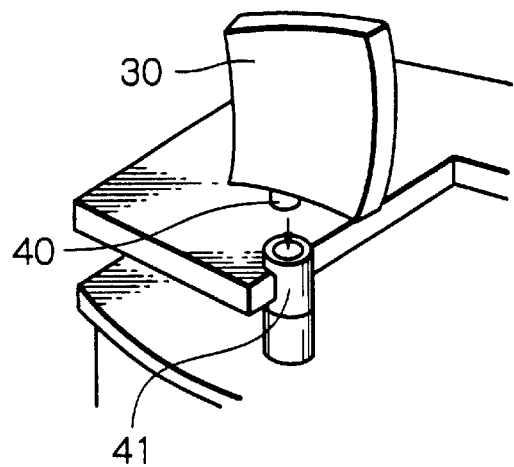
FIG. 9 is an isometric view showing a modification of an arrangement for mounting the operation and display device of any one of the illustrative embodiments.
Figure 10:
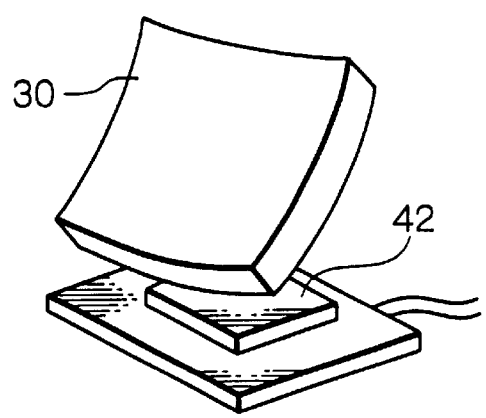
FIG. 10 is an isometric view showing another modification of the mounting arrangement.

FIGS. 9 and 10 each shows a particular modification of the arrangement for mounting the operation and display device 30 to the copier body 20 included in the above embodiments. In FIG. 9, a cylindrical lug 40 protrudes from the body 31 of the operation and display device 30. A hollow cylindrical receptacle 41 for receiving the lug 40 is formed in the copier body 20 in the vicinity of the rear of the body 20. In FIG. 10, the operation and display device 30 has its bottom supported by a base 42, so that the device 30 can be placed at any desired position like a desk lamp.

It should be noted that the operation and display device 30 may be supported by any suitable conventional scheme other than the schemes shown and described using an arm.

In summary, it will be seen that the present invention provides an image forming apparatus having various unprecedented advantages, as enumerated below.

(1) The distance from the operator to the display surface of a touch panel is substantially the same at all positions on the display surface. This allows the operator to manipulate an operation and display device including the touch panel smoothly with a minimum of movement of arm, hand and eye. In addition, the upper edge of an operation and display device serves as a penthouse and minimizes light to be incident to the touch panel.

(2) The operator can operate both of the touch panel and a key portion smoothly with substantially the same touch.

(3) The operator can stack documents at a document stacking section and operate the touch panel with a minimum of movement of body and eye. The apparatus is therefore easy to operate and reduces mishandling.

(4) The operator can deal with the operation and display device with a minimum of movement of body and eye while confirming the image of a copy driven out to a copy discharging section.

(5) The operator can easily manipulate the operation and display panel with the operator's right hand.

Various modifications will become possible for those skilled in the art after receiving the teachings of the present disclosure without departing from the scope thereof.

What is claimed is:

1. An image forming apparatus comprising:
   an apparatus body; and
   an operation and display device protruding upwardly from said apparatus body and including a touch panel which an operator can operate by touching;
   said operation and display device including a body curved in a substantially spherical configuration in an up-and-down direction and a right-and-left direction, said touch panel having a display surface positioned on a concave side of said body.

2. The apparatus as claimed in claim 1, wherein said body of said operation and display device includes a key portion arranged below said touch panel.

3. The apparatus as claimed in claim 2, wherein said operation and display device is positioned at a right portion of said apparatus body, as seen from a front of said apparatus body.

4. The apparatus as claimed in claim 2, further comprising a document stacking section provided on a top of said apparatus for stacking documents to be read, said body of said operation and display device adjoining said document stacking section.

5. The apparatus as claimed in claim 4, wherein said operation and display device is positioned at a right portion of said apparatus body, as seen from a front of said apparatus body.

6. The apparatus as claimed in claim 2, further comprising a sheet discharging section positioned at one side of said apparatus, said operation and display device adjoining said sheet discharging section.

7. The apparatus as claimed in claim 6, wherein said operation and display device is positioned on a left portion of said apparatus body, as seen from a front of said apparatus body.

8. The apparatus as claimed in claim 1, further comprising a document stacking section provided on a stop of said apparatus for stacking documents to be read, said body of said operation and display device adjoining said document stacking section.

9. The apparatus as claimed in claim 8, wherein said operation and display device is positioned on a right portion of said apparatus body, as seen from a front of said apparatus body.

10. The apparatus as claimed in claim 1, further comprising a sheet discharging section positioned at one side of said apparatus, said operation and display device adjoining said sheet discharging section.

11. The apparatus as claimed in claim 10, wherein said operation and display device is positioned at a left portion of said apparatus body, as seen from a front of said apparatus body.

12. The apparatus as claimed in claim 1, wherein said operation and display device is positioned at a right portion of said apparatus body, as seen from a front of said apparatus body.

* * * * *

UNITED STATES PATENT AND TRADEMARK OFFICE
CERTIFICATE OF CORRECTION

PATENT NO. : 6,259,866 B1
DATED : July 10, 2001
INVENTOR(S) : Kabumoto et al.

It is certified that error appears in the above-identified patent and that said Letters Patent is hereby corrected as shown below:

<u>Title page, Item [54], Column 1,</u>
The title should be:

-- [54] IMAGE FORMING APPARATUS HAVING SUBSTANTIALLY SPHERICALLY CURVED OPERATION AND DISPLAY DEVICE IN BOTH UP/DOWN AND LEFT/RIGHT DIRECTIONS --

Signed and Sealed this

Nineteenth Day of February, 2002

Attest:

Attesting Officer

JAMES E. ROGAN
Director of the United States Patent and Trademark Office